United States Patent [19]

Campagnolo

[11] 3,971,457
[45] July 27, 1976

[54] WHEEL HUB DISC BRAKE

[76] Inventor: Tullio Campagnolo, Corso Padova, 168, 36100 Vicenza, Italy

[22] Filed: Feb. 5, 1975

[21] Appl. No.: 547,249

[30] Foreign Application Priority Data
Feb. 5, 1974 Italy .................................. 20178/74

[52] U.S. Cl. .............................. 188/18 A; 188/26; 188/71.8; 188/72.3; 188/366
[51] Int. Cl.² .......................................... B60T 1/06
[58] Field of Search .................. 188/18 A, 26, 71.5, 188/71.8, 72.3, 72.4, 72.5, 73.2, 344, 366, 368; 192/85 AA, 85 CA; 301/6 CS, 6 E, 6 V

[56] References Cited
UNITED STATES PATENTS

| | | | |
|---|---|---|---|
| 2,102,406 | 12/1937 | Cohen | 188/366 |
| 2,293,213 | 8/1942 | Osborn | 188/366 |
| 2,551,252 | 5/1951 | DuBois | 188/71.8 |
| 2,866,526 | 12/1958 | Wiseman | 188/71.8 |
| 3,185,256 | 5/1965 | Schilling | 188/366 |
| 3,268,035 | 8/1966 | Wagner | 188/73.2 |
| 3,589,478 | 6/1971 | Plaat | 188/71.8 |
| 3,776,597 | 12/1973 | Camps | 188/26 |
| 3,858,692 | 1/1975 | Luchier et al. | 188/72.4 |

FOREIGN PATENTS OR APPLICATIONS

| | | | |
|---|---|---|---|
| 641,486 | 8/1950 | United Kingdom | 188/71.8 |
| 510,037 | 7/1939 | United Kingdom | 188/72.4 |

Primary Examiner—Trygve M. Blix
Assistant Examiner—Edward R. Kazenske
Attorney, Agent, or Firm—Young & Thompson

[57] ABSTRACT

A disk brake, of the type embodying the brake disk in the hub of the vehicle wheel and especially a motorcycle wheel having: a ring-shaped brake disk supported by a ribbed disk of the hub; a brake plate axially movable but locked against rotation; fluid pressure control means for driving the plate into friction engagement with said ring-shaped brake disk and return means acting against said control means.

2 Claims, 2 Drawing Figures

WHEEL HUB DISC BRAKE

BACKGROUND OF THE INVENTION

1. Field of the Invention

The present invention relates to a disk brake for wheels of vehicles and especially for motorcycle wheels, designed to solve some important problems connected with the braking of such vehicles. It is known that in some vehicles, typically in motorcycles, the application of disk brakes has met so far with only limited success — in spite of the felt need to replace (especially in large motorcycles) the drum brakes by more modern and efficient brakes — due to some problems not easy to solve. In particular, a serious difficulty was represented by the rational placement of the disk, usually arranged to the side of the wheel with the respective calipers, with consequent weight unbalances in the case of motorcycles.

2. Description of the Prior Art

In order to obtain a rational solution of this important problem, it has already been suggested: to embody the brake disk in the hub of the vehicle wheel (particularly a motorcycle wheel), attributing directly to said disk, or to the elements designed for the support thereof, also functions of connection between the actual hub and its flange or crown for attachment of the wheel spokes; to arrange said disk centred on the symmetry plane of the wheel and of the hub, perpendicular to the wheel axis; and to act on the disk itself with friction pads, carried by support plates, mounted on the wheel axis and applying their own reactions to the disk.

However, the simple versions of said solution, which have been studied and experimented with so far, have not allowed one to realize acceptable practical results particularly due to the structural problems that have arisen.

SUMMARY OF THE INVENTION

The present invention now provides a disk brake which, although being based on the aforespecified general principles, is however provided with original characteristics, adapted to allow a practical application thereof, which is fully satisfactory from the technical point of view and from the point of view of efficiency, with remarkable advantages over all the brakes being used at present, especially in the motorcycle field.

This brake is characterized by at least one ring-shaped brake disk embodied in the wheel hub, between the actual hub and its spokes-carrying flange, supported by a ribbed disk arranged transversly to the wheel axis and connecting said actual hub with said flange, the ring-shaped brake disk being perpendicular to said axis; and by at least one brake plate mounted on the wheel axis, parallel to said ring-shaped brake disk, and axially movable but locked against rotation, and fluid pressure control means acting on said plate for driving the same, against the action of return means, into friction engagement — through friction pads carried thereby — with said ring-shaped disk.

A first preferred embodiment of the invention provides for two ring-shaped brake disks, supported by a central ribbed disk perpendicular to the wheel axis, the two ring-shaped disks being parallel to and equally spaced from the ribbed disk; and for two brake plates mounted on the wheel axis, one on one side and one on the other of the hub, and adapted to engage by friction the ring-shaped disks on their outer faces.

A second preferred embodiment of the invention provides for a single disk and a single brake plate, the ribbed disk connecting the actual hub and the spokes-carrying flange being placed on one side of the hub, and the ring-shaped brake disk carried thereby, as well as the brake plate, being placed on the other side of the hub. In this second embodiment, the ribbed disk has a frustoconical shape.

In the brake according to the present invention, the fluid pressure means controlling the brake plate preferably consist of a cylinder-piston unit, associated with the plate and comprising a circular recess at the centre on the outer part of the plate, being fed at the bottom by brake fluid, a ring piston tight housed in said recess, and a radial flange, adapted to oppose said piston and forming part of a bush fitted onto the wheel axis and on which is mounted axially slidably said plate.

According to the invention, the return means of the brake plate in a disengaged position, preferably comprise a plurality of adjustable devices uniformly distributed on the periphery of the flange opposing the piston, each of said devices being adapted to take up the slack and consisting of a spring tied to said plate, and of a pin projecting (parallely to the wheel axis) from said flange — where it is mounted with for elastically opposed axial movements of a pre-determined magnitude — and penetrating into the seat of the plate containing the spring, so as to be held by said spring in frictional engagement.

BRIEF DESCRIPTION OF THE DRAWINGS

The invention will now be described in further detail, by mere way of example, with reference to the accompanying drawings, in which.

Both drawings illustrate the hub body M of a motorcycle wheel, carried by the arms F of a fork on a rotation axis A, the hub body M embodying the disk brake according to the present invention.

DESCRIPTION OF THE PREFERRED EMBODIMENTS

Figure 1:
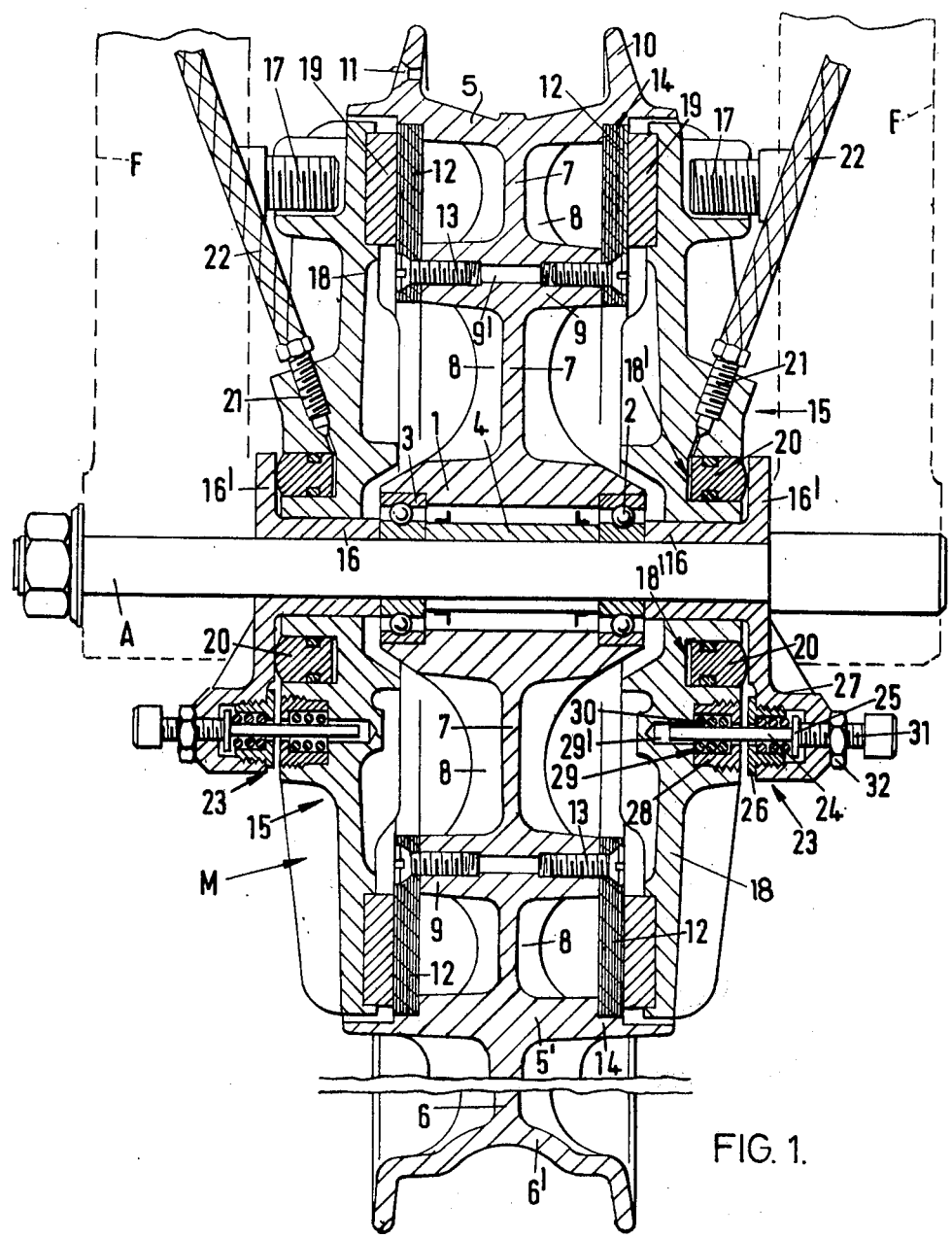
FIG. 1 is an axial cross section of a first of two preferred embodiments thereof, suitable for being applied to a wheel of a motorcycle.

As shown in FIG. 1 of the drawings, in the first embodiment of the invention, an actual hub 1 of the wheel is mounted on the pivot A, with the interposition of ball bearings 2 and 3, being spaced by a spacing bush 4. Normally, a hub body for a motorcycle wheel is formed by an actual hub and by a flange, to which are connected the ends of the wheel spokes, said spokes being fixed at their other end to the tire rim of the wheel itself (spokes wheel), or by an actual hub and by a disk, connecting the hub body to the tire rim (disk wheel). This structure is substantially adopted in the shown arrangement of the invention, wherein the actual hub 1 and the spokes-carrying flange 5 (upper part of FIG. 1), or the actual hub and the flange 5', from which departs the disk 6 of the wheel, ending into the tire rim 6' (lower part of FIG. 1), are connected by a disk 7, having a plurality of radial stiffening ribs 8. The disk 7 extends from the center of the actual hub 1 and is arranged on the symmetry plane of the wheel, perpendicular to the axis. Its radial ribs 8 comprise intermediate enlargements 9, arranged slightly beyond half-way the disk 7, and having transverse threaded seats 9'; the flange 5 comprises in turn two projections 10, adapted to house, in holes 11 thereof, the inner ends of the spokes of the wheel on which the hub has to be applied.

According to the invention, two metal ring disks 12, with fully smooth surface, are mounted between the inner part of the flange 5 (or 5') and the ribbed disk 7, being fixed by means of bolts 13 screwed into the seats 9' of the enlargements 9. These two disks are in the form of flat annuli, lying on planes perpendicular to the axis of the hub 1 and being parallel to and equally spaced from the ribbed disk 7; these disks are inserted in seats 14 of the inner part of the flange 5.

The invention further provides for a pair of equal and opposed brake-plates 15, mounted between the fork arms F and the hub 1, on a pair of bushes 16 fitted onto the axis A, said plates being prevented from rotating about said axis by stiff connection means to the arms of the fork, said connection means being of any type, as for example pins 17.

Each plate 15 is provided with a ribbed metal flat piece 18, bearing at the periphery, on the inner part facing the hub, ring disks or sectors 19 of high friction material, corresponding to the metal disks 12 of the hub body M, and adapted to act on said disk 12 as friction pads. At the enter, on the outer part facing the respective arm of the fork, the flat pieces 18 are provided with a circular recess 18' housing a ring piston 20. Hydraulic brake fluid may be fed to the bottom of the recess 18', through a pipe 21 of the piece 18, from a flexible pipe 22.

The piston 20 is arranged for movement according to the hub axis and under the pressure of the brake fluid — between the bottom of the recess 18' and a flange 16', by means of which both bushes 16 bear against the arms of the fork F. Between said flanges 16' and the central part of the pieces 18 of the brake-plates 15, are mounted one or more (preferably three) return devices 23, adapted to draw back the plates 15, and hence the pieces 18 and the friction pads 19, to a rest position, out of engagement from the ring disks 12, as the pressure of the hydraulic brake fluid on the pistons 20 stops.

The above devices may be adjusted during assembly and are also adapted to take up any slack which may be present, and in particular the slack produced by wear of the friction pads 19.

In short, they comprise a pin 24 with head 25, connected to the flange 16' — from which it projects — by means of a threaded ring nut 26, which is fixed by screwing into one of the seats appropriately provided on the periphery of the inner side of the flange 16'. Between the head 25 of the pin 24 and the ring nut 26 is interposed a cylindrical helical spring 27. The pin 24 projects from the flange 16' to be inserted into a ring nut 28, which houses in an appropriate seat 29 of the piece 18 a cylindrical helical spring 30. The pin 24 is pressure inserted into the axial cylindrical cavity of said spring 30, in respect of which it may move only by overcoming very high friction forces. The pin 24 then extends beyond the ring nut 28 and the spring 30, housing itself in an extension 29' of the seat 29. According to the invention, on the appropriately threaded bottom of the seat provided for the pin 24 of the flange 16', is screwed a screw 31 with knurled head, so that an end thereof may be in contact with the outer part of the head 25 of the pin 24. The position of this screw may easily be fixed by a nut 32, once the adjustment has been carried out.

Figure 2:
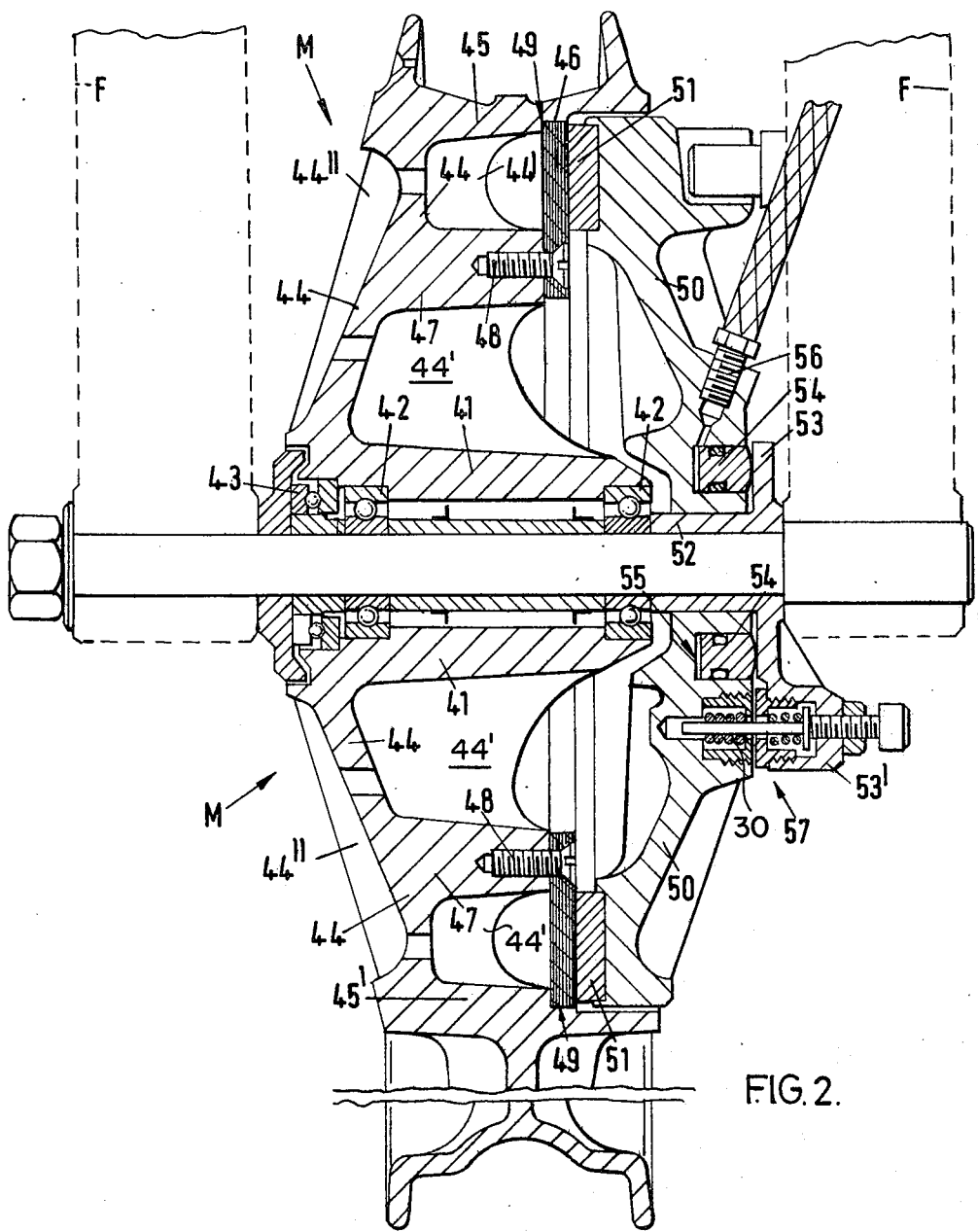
FIG. 2 is a view similar to FIG. 1 but showing the other of the two preferred embodiments.

As shown in FIG. 2 of the drawings, in the second embodiment of the invention, the hub body M is formed by an actual hub 41, mounted in known manner on bearings 42, 43, on the axis A, by a ribbed disk 44, and by a spokes-carrying flange 45 (upper part of the drawing), or by a disk-carrying flange 45' (lower part of the drawing). As can be seen, the disk 44 is substantially of frustoconical shape and comprises inner ribs 44', extending in an axial sense into the hub body M, and shallow outer ribs 44''.

A ring-shaped brake disk 46 is fixed on an axial extension 47 of the disk 44 which connects the inner ribs 44' (and which may be continuous or interrupted) by means of screws 48, the outer periphery of said disk 46 being in engagement with a circumferential seat 49, obtained along the inner part of the flange 45 (or 45').

The disk brake according to the invention further comprises a brake plate 50 having outer ribs 50' and provided with peripheral friction pads 51, adapted to engage the ring disk 46. The plate 50, of a substantially frustoconical shape, is mounted on the axis A by means of a bush 52, which bears with a flange 53, beyond the plate 50, on the fork F. An annular piston 54, housed in a cylinder 55 — also annular — of the plate 50, is used as fluid pressure control means, the fluid being fed from 56 to the bottom of the cylinder 55. On the outer part, the flange 53 extends radially into three or more projections 53', on which are mounted adjustable spring return means 57, a portion 58 of which is housed in the plate 50. Such return means are identical to those already described in the previous embodiment of the brake according to the present invention.

During the operation, the disk brake according to the present invention behaves as specified hereinafter: In the normal running of the vehicle, the hub 1 (41) and the wheel mounted thereon roll freely on the axis A, the plates 15 (or the plate 50) being held towards the arms F of the fork by the appropriate return devices 23 (57, 58), as will be seen hereinafter, in order to preclude any contact between the disks 12 (or the disk 46) and the friction pads 19 (51). When braking takes place, the control operation performed by the driver of the motorcycle (or other vehicle) equipped with the wheel having the brake according to the invention, produces the inflow of brake fluid to the bottom of the recesses 18' (55) and drives the annular pistons 20 (or the piston 54) out of said recesses. Since such pistons are stopped by the flanges 16' (53), the plates 15 (or the plate 50) are shifted and hence pressed towards the hub 1 (41): consequently, the friction pads 19 (51), locked against rotation, engage by friction the ring disks 12 (or the ring disk 46), which are rotating, and tend to slow down their rotation up to stopping them, thus locking therewith the hub 1 (41) and the wheel of the vehicle.

The braking is smooth and progressive, there are no unbalances due to non-centered elements, and the heat is easily removed owing to the structure of the brake, especially if one makes use of ventilation holes (not shown), appropriately arranged according to the running direction of the vehicle when the latter is moving, and provided on the brake plates 15 (or on the plate 50), and of corresponding air outlets or vents. The brake disk and the relative friction pads are protected from dirt and weather inclemency, and this improves efficiency in time and in all conditions of use of the brake according to the present invention.

At the end of the braking action, the return devices arranged between the plates 15 and the flanges 25 (or between the plate 50 and the flange 53), call back the plates to the rest position, to cause the braking of the wheel — equipped with the brake of the invention — to come to an end.

For this purpose, it is to be noted that when sending brake fluid under pressure to each recess 18' (55) — so as to carry out the braking — hence shifting from the outside the plate 15 (50) towards the hub 1, the pin 24 of each of the return devices (FIG. 1) remains locked by friction, to the spring 30, while the plates 18 move away from the flanges 16', so that the head 25 of the pin 24 presses the spring 27. When the braking action stops, this spring tends to drive back the head 25 of the pin 24 to the initial position and, always thanks to the high friction engagement between the actual pin 24 and the spring 30, the whole plate 15 is hence drawn back to a rest position, thereby disengaging the ring disk 12 from the braking action of the friction pads 19. Such return devices allow a continuous automatic take-up of the slacks and an accurate adjustment of the extent of such slacks.

As to the continuous automatic take-up of the slacks, if the slack between the pads 19 and the brake disk 12 increases in respect of the established value, the pin 24 is forced to slide during braking, overcoming the friction in respect of the spring 30, once the spring 27 has been completely pressed by the head 25 of the pin, up to when the pads 19 engage with the disk 12. In this way, once the parts have returned to a rest position, the slack between the pads 19 and the ring disk 12 is restored to its normal extent, equal to the stroke permitted to the head 25 of the pin 24 with the spring 27 in the ring nut 26.

As to the adjustment of the slack, it may be seen at once — after what has been said — that the slack between the friction pads 19 of the plate 15 and the brake disk 12, will be equal to the axial slack between the head 25 of the pin 24 and the ring nut 26. Hence, the adjustment of the brake slack may be carried out — for example upon assembly — through adjustment of the slack between the head 25 and the ring nut 26, by more or less screwing the adjustment screw 31, which sets the position of the head 25 and which is provided with a knurled head for easy control.

It is understood that there may be other embodiments of the brake according to the present invention, as per the previous description, and that the drawings are merely provided by way of example.

I claim:

1. Disk brake for wheels of vehicles, of the type in which a ring-shaped brake disk is disposed between a hub rotating about a wheel axle and a spokes-carrying flange, comprising:

a generally frusto-conical ribbed disk extending transversely to said wheel axle and connecting said hub with said spokes-carrying flange;

a ring-shaped brake disk, supported by said ribbed disk and perpendicular to said wheel axle;

a brake plate, mounted on said wheel axle, beside said ribbed disk, and parallel to said ring-shaped brake disk, said brake plate being axially movable but locked against rotation;

an annular friction pad assembly on the periphery of said brake plate and adapted to engage said ring-shaped brake disk when the brake plate is driven toward said ribbed disk;

fluid pressure control means, acting on said brake plate, for driving the same toward said ribbed disk, and comprising a circular recess forming a cylinder on the outer central part of the brake plate, and means for feeding said cylinder with brake fluid; an annular piston in said recess; and a radial flange opposing said piston and forming part of a bush, fitted onto the wheel axis and on which is axially slidably mounted said brake plate;

and return means to move said brake plate away from said ribbed disk, comprising a plurality of adjustable devices, automatically taking up slack and uniformly distributed about the periphery of said radial flange, each said device comprising a spring tied to said plate and a pin projecting parallel to the wheel axle from said flange and extending into the plate containing the spring so as to be held by the latter in frictional engagement.

2. Disk brake as in claim 1, in which the pin of said return means is mounted inside said flange by means of a ring nut, holding a contrast spring with an end head of the pin, while the spring in the plate is also held in its seat by a ring nut, and in which the slack between said pin head and said ring nut in the flange is adjustable by means of a screw that is screwed on the bottom of the seat provided in the flange for the pin, said screw acting with its end on said pin head and being adapted to be controlled from the outer part of the flange through a lock nut.

* * * * *